United States Patent [19]

Cathers

[11] 4,362,461
[45] Dec. 7, 1982

[54] SELECTIVE VACUUM LIFTING DEVICE
[75] Inventor: William P. Cathers, Allison Park, Pa.
[73] Assignee: PPG Industries, Inc., Pittsburgh, Pa.
[21] Appl. No.: 153,373
[22] Filed: May 27, 1980
[51] Int. Cl.³ .............................................. B66C 1/02
[52] U.S. Cl. ............................... 414/752; 414/744 B; 414/786; 294/64 R; 198/689
[58] Field of Search ................... 414/744 B, 752, 730, 414/737, 61, 736; 294/64 R, 65; 198/689, 486; 269/21

[56] References Cited
U.S. PATENT DOCUMENTS 3,743,340  7/1973  Williamann .................... 294/64 R
3,910,621 10/1975  Hillier .......................... 294/64 R
4,236,710 12/1980  Nakamura ........................ 198/689
4,252,497  2/1981  Burt ............................ 414/752 X Primary Examiner—Robert J. Spar
Assistant Examiner—Terrance L. Siemens
Attorney, Agent, or Firm—Donald C. Lepiane; Lee Patch

[57] ABSTRACT

A vacuum lifting device having a plurality of chambers, each chamber having an isolating member within to control communication between a common vacuum plenum and a sheet engaging surface. Each isolating member is controllable independent of the presence of an article adjacent the sheet engaging surface to allow for lifting selected ones of a plurality of articles. Those chambers which overlie at least a portion of a selected article and which overlie no portion of an unselected article are activated, or, alternatively, those chambers which overlie a single selected article completely within the peripheral boundaries thereof are activated.

10 Claims, 8 Drawing Figures

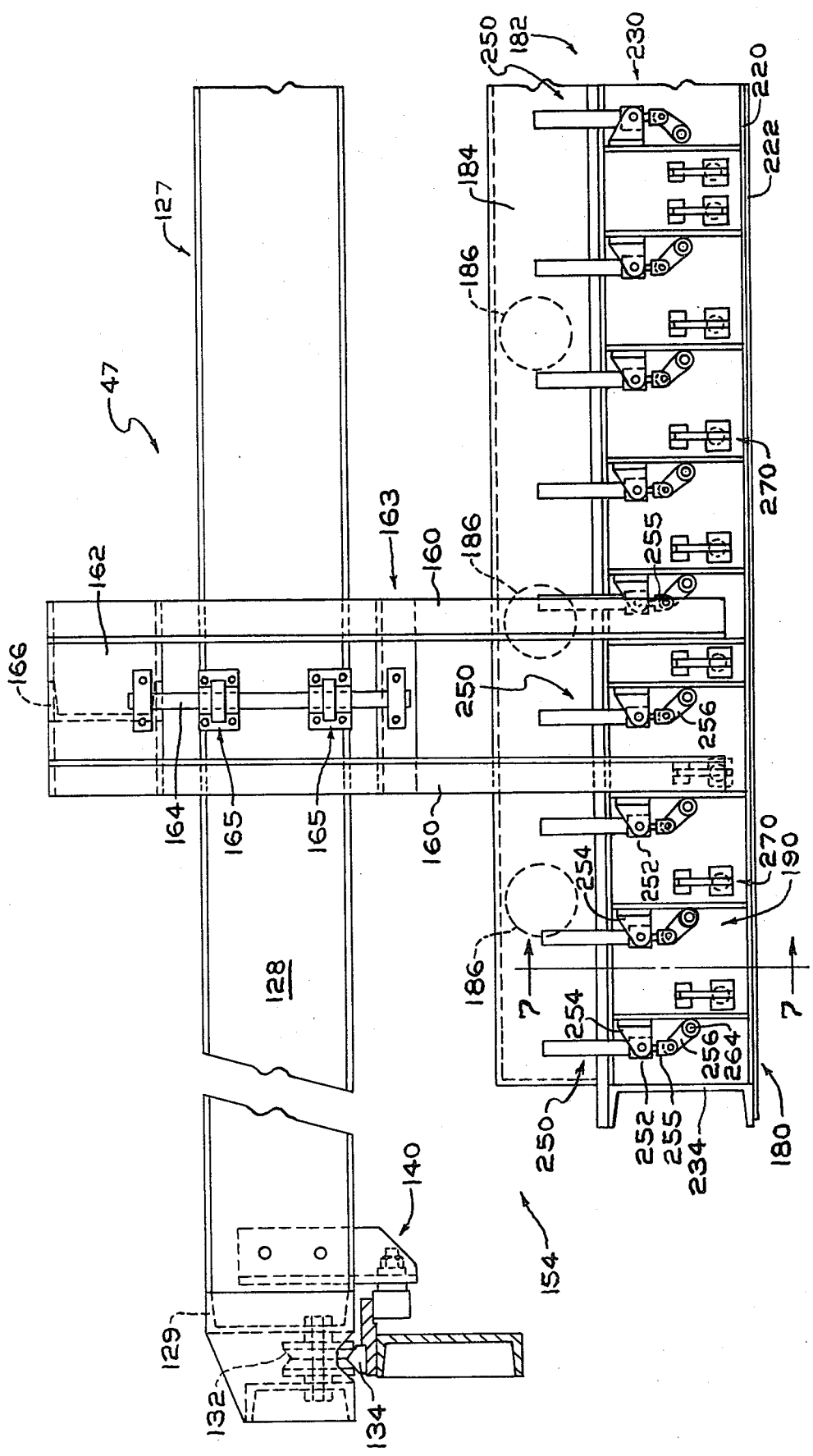

SELECTIVE VACUUM LIFTING DEVICE

BACKGROUND OF THE INVENTION

1. Field of the Invention

This invention relates to sheet transfer devices and more particularly to vacuum lifting devices and methods of using same.

2. Description of the Technical Problems

It is recognized to lift and transfer objects by engaging a surface of the object with a vacuum device. It is also recognized to provide a plurality of vacuum chambers in a single device for lifting large objects, or for simultaneously lifting a plurality of objects. U.S. Pat. No. 3,523,707 to Roth in general teaches a vacuum lifting device having a vacuum source in communication with a vacuum plenum, and a plurality of vacuum chambers each communicating with the plenum by a single orifice. Vacuum is drawn through the vacuum plenum to each chamber through their respective orifices, and a light weight freely moveable ball in each chamber is responsive to and controls the flow of ambient air therethrough. A flow of ambient air through the chamber lifts the lightweight ball from its rest position and seats it into the communicating orifice between the chamber and plenum to control the vacuum. If an object is in proper position adjacent a chamber, air flow will not result, the light weight ball will not be lifted to isolate the chamber from the plenum, and the vacuum from the plenum will act on the object to lift same. There are limitations to the above-described device, however, because a positive seal is not assured between the ball and orifice resulting in possible vacuum leakage in unused chambers i.e. chambers not adjacent the object. Further, to release objects from engagement with the device, all the vacuum in the plenum chamber is released to the ambient atmosphere. Still a further limitation is that the device, when activated, automatically applies suction to all objects adjacent to the vacuum chambers and therefore is not capable of lifting selected ones of a plurality of sheets or objects.

U.S. Pat. No. 3,591,228 to Webb teaches in general a vacuum lifting device having a vacuum source and a plurality of vacuum chambers each communicating with a plenum through a single orifice. A spring mounted valve member within each chamber has a valve stem end extending beyond the engaging surface. The valve stem opens its respective orifice when contacted with the object to be lifted. In this manner, Webb's device automatically activates only those chambers in contact with rigid objects. Although the device is acceptable for its intended purpose, it is not readily usable for lifting selected ones of a plurality of objects or sheets, because all chambers having their valve stems in contact with rigid objects are automatically activated. Further, to release objects it is necessary to release the vacuum within the plenum to the ambient atmosphere.

U.S. Pat. No. 2,783,018 to Lytle in general teaches a vacuum lifting device having a dual valve system to activate and deactivate a vacuum chamber. A first valve assembly located between a vacuum source and the chamber operates in a first position to provide vacuum into a lower portion of the chamber, below a second valve located within the chamber. When an object is adjacent the lifting surface of the chamber the vacuum in the lower portion of the chamber pulls the second valve down onto its valve seat to seal the lower portion of the chamber from ambient atmosphere to exert suction upon the object to lift same. By moving the first valve to its second position, vacuum is diverted from the lower portion of the chamber to lift the second valve from its valve seat and permit communication between the ambient atmosphere and the chamber, to release an object from engagement with the device. This device is limited, however, by its mechanical complexity.

U.S. Pat. No. 3,202,302 to Insolio and U.S. Pat. No. 3,592,334 to Fleischauer each in general teach vacuum transfer conveyors having endless moving porous belts. Sheets are urged against the belt by vacuum and transferred to a destination where they are released. These devices are limited by their inability to lift selected ones of a plurality of sheets and by their inefficient use of vacuum which results from continually pulling vacuum through areas of the porous belt which are not engaged to a sheet. It would be advantageous to have a vacuum lifting device which could selectively lift objects while avoiding the limitations discussed above.

SUMMARY OF THE INVENTION

This invention relates to a vacuum lifting device comprising at least one chamber having an apertured wall portion, a vacuum supply, and facilities for connecting the chamber and the vacuum supply. Mounted within the chamber is an isolating device which is acted upon by a member located without the chamber and spaced from the chamber's apertured wall portion to move the isolating device into one of two positions. In the first position the isolating device isolates the apertured wall portion of the chamber from the vacuum supply and in the second position the isolating device provides communication between the apertured wall portion of the chamber and the vacuum supply to permit a vacuum to be drawn through the chamber.

This invention also relates to facilities for introducing atmospheric pressure to the interior surface of the apertured wall portion when the isolating device moves toward the first position, to provide a positive quick release of engaged objects, by removing any residual vacuum present at the apertured wall portion when the isolating device moves from its second position toward its first position. For example, a valve assembly is biased open by the isolating device moving toward its first position, to permit ambient atmosphere to enter the portion of the chamber between the isolating device and the apertured wall portion.

This invention also relates to a vacuum lifting device comprising a plurality of the above-described chambers each having apertured wall portions adjacent one another to lift selected ones of a plurality of objects.

This invention further relates to a method of lifting selected ones of a plurality of sheets by providing a plurality of adjacent chambers each having a foraminous surface adjacent one another to provide an engaging surface. The engaging surface is positioned over the major surface of a plurality of sheets and vacuum is drawn through selected chambers to urge the selected sheets to the engaging surface. Chambers having foraminous surfaces overlying at least a portion of a selected sheet and overlying no portion of an unselected sheet may be activated. Alternatively, chambers having foraminous surfaces overlying a single selected sheet completely within its peripheral boundaries may be activated.

The present invention provides a vacuum lifting device having the desired selective capability which minimizes vacuum loss from the plenum when an object is released from engagement by providing an isolating device within each chamber which is controlled independently of and is nonresponsive to the presence of an object near the chamber's apertured wall portion. Thus, selected ones of a plurality of sheets can be engaged and the release of the engaged sheets can be accomplished by controlling the position of the isolating device rather than by releasing all plenum vacuum to the atmosphere as proposed by the presently available devices. Further, the invention provides for the positive release of engaged objects by introducing atmospheric pressure through a valve mechanism to the interior of a portion of the chamber when the position of the isolating device is so controlled.

BRIEF DESCRIPTION OF THE DRAWINGS

FIG. 5 is a fragmentary elevational side view of the left side section of the device as shown in FIG. 2 with portions removed for clarity.

DESCRIPTION OF THE INVENTION

Figure 1:
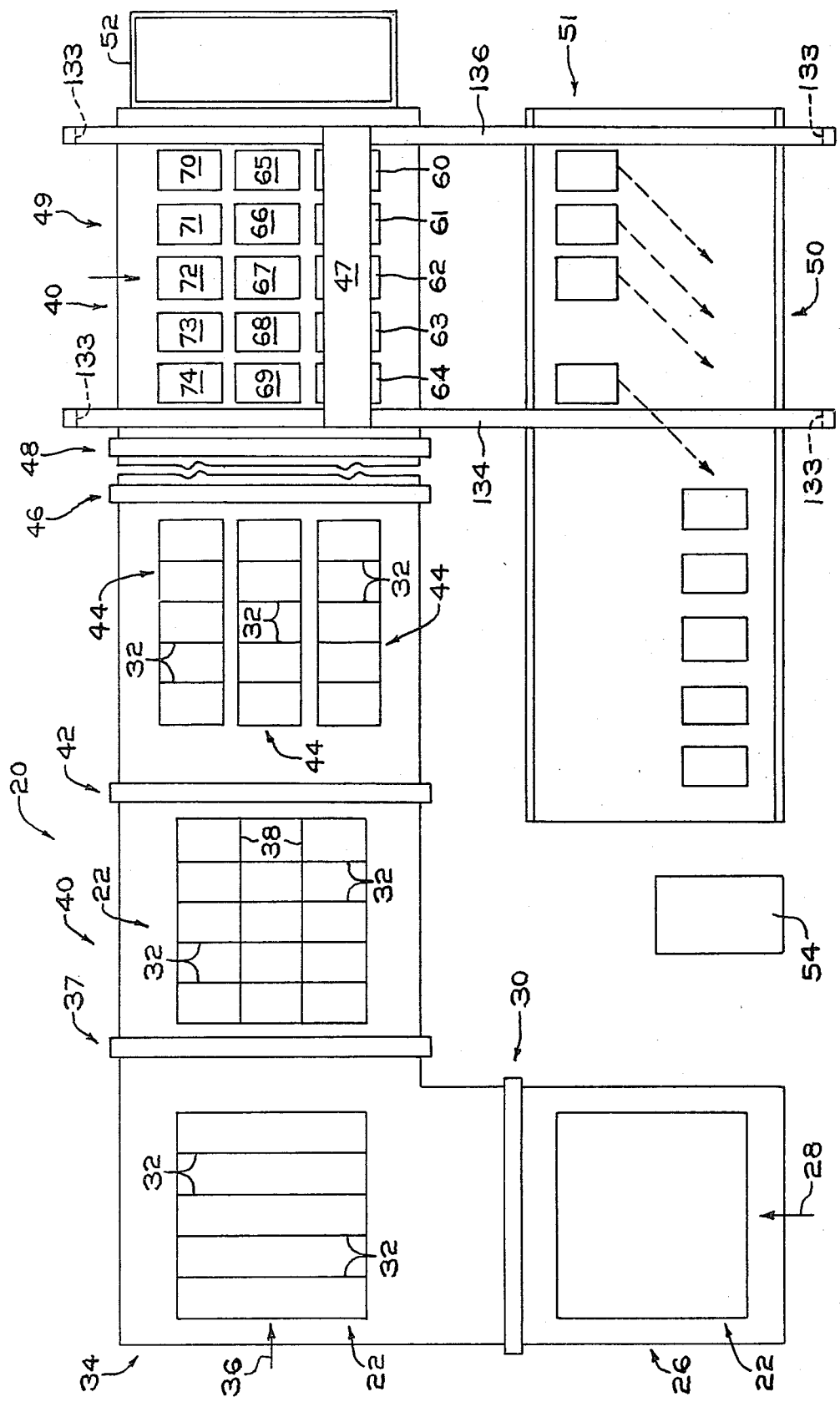
FIG. 1 is a schematic plan view of a system for scoring, snapping, inspecting, separating and stacking sheets incorporating features of the present invention.

FIG. 1 shows a system 20 having scoring stations 30 and 37 and score opening stations 42 and 46 to sever a piece of glass 22 into glass sheets 60-74. A transfer station 47 incorporating features of the present invention transfers selected ones of glass sheets 60-74 from a pickup position 49 on conveyor 40 to a release position 51 on conveyor 50, which then separates and aligns the glass sheets 60-74 thereon, after which stacking station 54 conveniently stacks same.

In general, the glass piece 22 is advanced by conveyor 26 in the direction of arrow 28 past a scoring station 30 to impose lateral scores 32 in the glass piece 22. The scored glass piece 22 moves onto a corner table 34 and is advanced in the direction of arrow 36 past a second scoring station 37 to impose longitudinal scores 38 in the glass piece 22. Scoring stations 30 and 37 may be of the type taught in U.S. Pat. No. 4,096,773 to R. P. De Torre, which teachings are herein incorporated by reference.

The scored glass piece 22 is advanced by conveyor 40 through longitudinal score opening station 42 to open the longitudinal scores 38 in any convenient manner, e.g., as taught in U.S. Pat. No. 4,109,241 to R. P. De Torre, which is incorporated herein by reference. The glass sections 44 are advanced by conveyor 40 to a lateral score opening station 46 to open the lateral scores 32 and space adjacent edges of the glass sheets 60-74, e.g. as taught in U.S. Pat. No. 4,088,255 to R. P. De Torre, which teachings are herein incorporated by reference.

Glass sheets 60-74 are advanced by conveyor 40 through an inspection station 48 to a pickup station 49. As the sheets advance through the inspection station 48 the glass sheets 60-74 are conveniently inspected, e.g., visually or automatically, for defects and acceptable specimens, e.g. unbroken sheets, are differentiated from unacceptable specimens, e.g. broken sheets.

Transfer device 47 incorporating features of the present invention moves between conveyors 40 and 50 to lift and transfer acceptable sheets from the pickup position 49 to the release position 51 of the conveyor 50 in a manner to be discussed below. The unacceptable sheets are disposed of in a convenient manner, e.g. after the acceptable sheets have been lifted and transferred, conveyor 40 advances the unacceptable sheets from pickup station 49 to cullet hopper 52.

Figure 2:
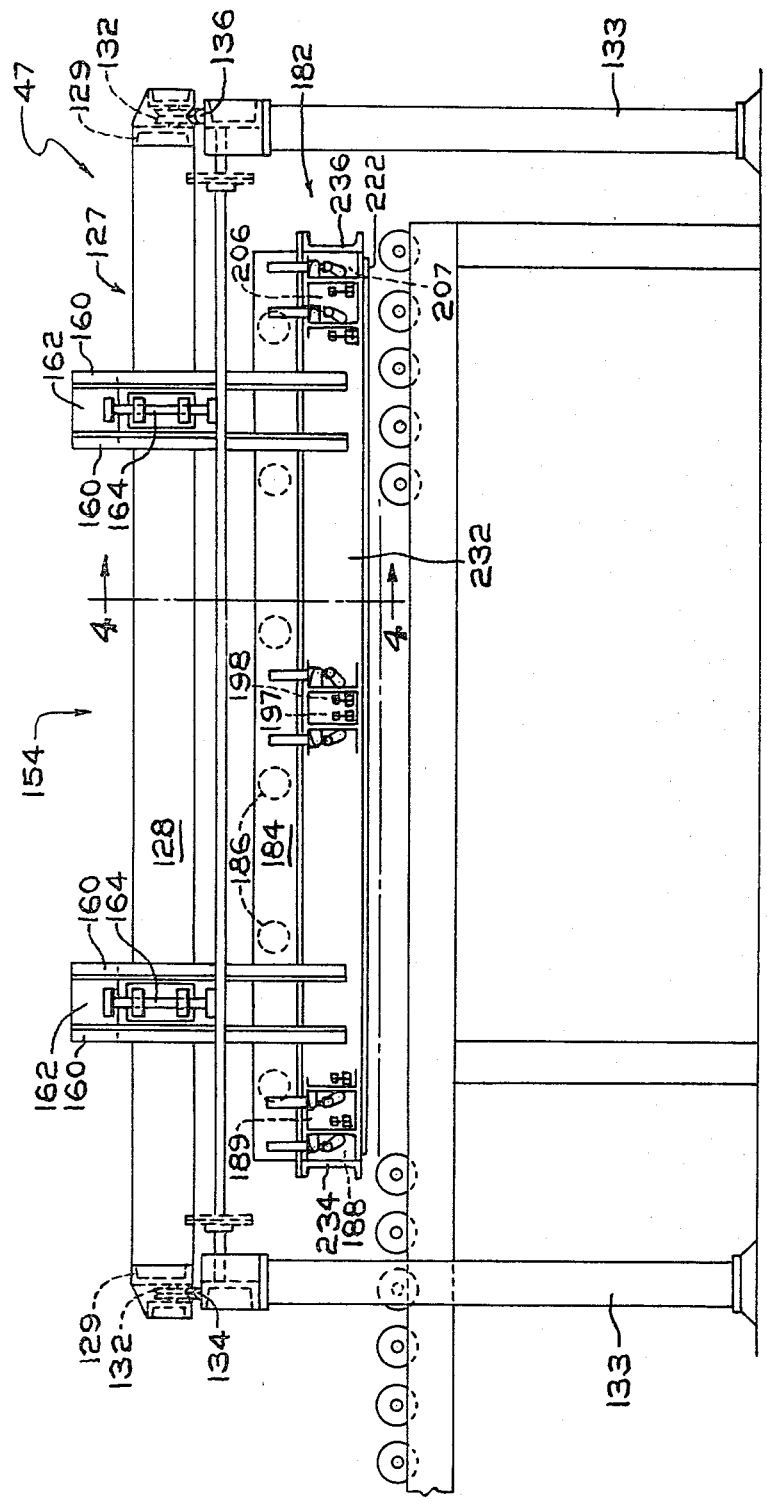
FIG. 2 is an elevational side view of a sheet lifting device incorporating features of the invention for use in the system of FIG. 1.
Figure 3:
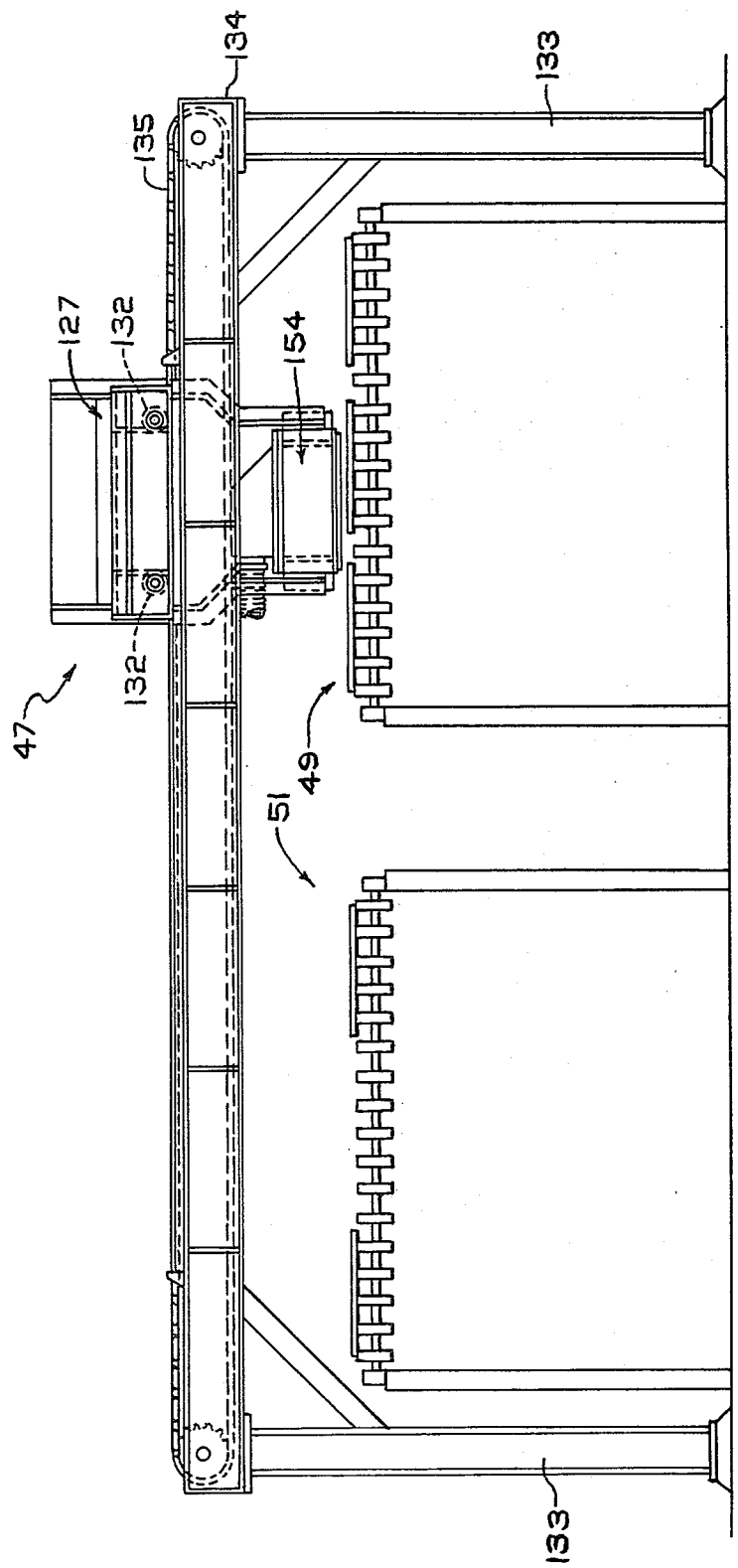
FIG. 3 is an elevational end view of the sheet lifting device of FIG. 2.

With reference to FIGS. 1, 2 and 3, transfer device 47 moves between pickup position 49 and release position 51 of conveyors 40 and 50, respectively, on a pair of tracks or guiderails 134 and 136 supported by vertical members 133.

Referring to FIGS. 2, 3, and 5, a superstructure 127 is movably mounted on guiderails 134 and 136 by wheels 132 and guide wheel assemblies 140, for movement between pickup position 49 and release position 51. The superstructure 127 is conveniently formed of a pair of elongated C-shaped beams 128 and end beams 129, with a pair of cross braces 156 (one only shown in FIG. 4) rigidly secured thereto between C-shaped beams 128 equidistant from end beams 129 to provide support for the sheet lifting assembly 154 to be described hereinafter.

Referring to FIG. 3, a drive system 135 conveniently moves superstructure 127 along guiderails 134 and 136 to a selected position along its reciprocating path and may consist of a motor, chain, and sprocket assembly or any other convenient configuration known to the art.

Figure 4:
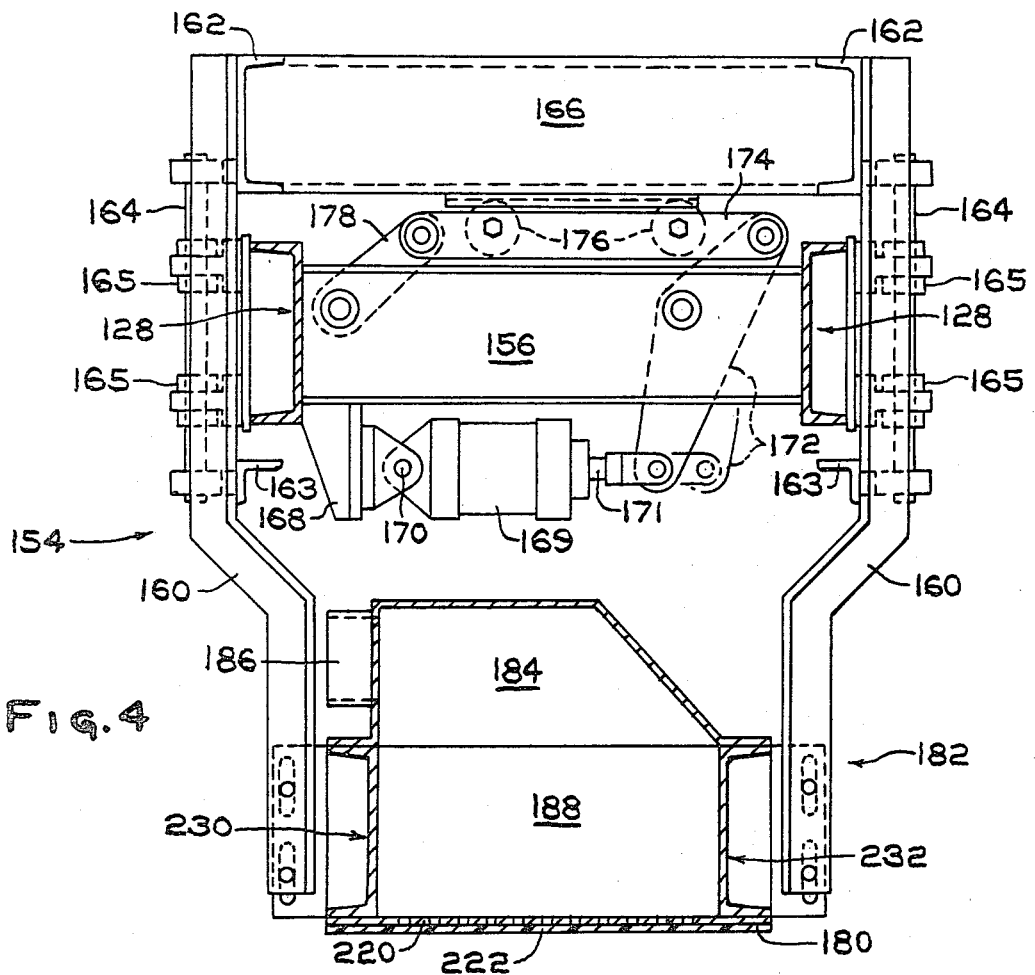
FIG. 4 is a sectional view taken along lines 4—4 of FIG. 2 with portions removed for clarity.

Referring now to FIGS. 2, 4 and 5 sheet lifting assembly 154 is suspended from and supported by superstructure 127 by four pairs of vertical support arms 160 which are positioned about the end portions of cross braces 156 and extend therebelow to engage a sheet engaging assembly 182. Cross members 162 and 163 connect members of the pairs of support arms 160 at their upper and middle portions respectively, and support a vertically disposed guiderod 164 therebetween. Bushing blocks 165 are secured to the outside of superstructure 127 and slidingly maintain guiderods 164 in a vertical orientation when the sheet lifting assembly 154 is raised and lowered. Lift plates 166 extend parallel to and above cross braces 156 to interconnect opposing pairs of vertical support arms 160 at the center of their respective upper cross members 162.

Downwardly projecting from cross braces 156 (on the left side thereof as seen in FIG. 4) is a mounting bracket 168, having a horizontally extending clevis 170 to which one end of a piston cylinder assembly 169 is pivotally connected, the rod end of which is connected to a generally upwardly extending, pivotally mounted lever arm 172. The upper portion of the lever arm 172 is attached to one end of a horizontal link 174, the other end of which is attached to a pivotally mounted lever arm 178. Rollers 176 are rollably mounted to horizontal link 174 and are arranged so that their upper surfaces ride on the lower surface of the lift plate 166.

With continued reference to FIG. 4, extension of the piston rod 171 of piston cylinder assembly 169 will raise the sheet lifting assembly 154 a controlled amount, the amount of vertical displacement being determined by the amount of extension of the rod 171. The sheet lifting assembly 154 is lowered to its rest position by the retracting of the rod 171 into piston cylinder 169.

Referring to FIGS. 2, 4 and 5, the sheet engaging assembly 182 is formed of a pair of spaced apart elongated C-shaped members 230 and 232 connected at adjacent ends by C-shaped end members 234 and 236. A vacuum plenum 184 with inlet ports 186 is mounted over one open end of the assembly and an apertured plate 220 is mounted over the opposite open end of the assembly, thus forming an enclosure. As shown in FIGS. 2, 4, and 5, in a preferred embodiment apertures having a 0.187 inch (0.5 cm) diameter are positioned on 1.0 inch (2.54 cm) centers about the major surface of the apertured plate 220. A foraminous pad 222 of approximately 0.25 inch (0.63 cm) thick polyurethane foam is conveniently fastened to the bottom surface of the apertured plate 220 to provide a sheet engaging surface 180.

Figure 6:
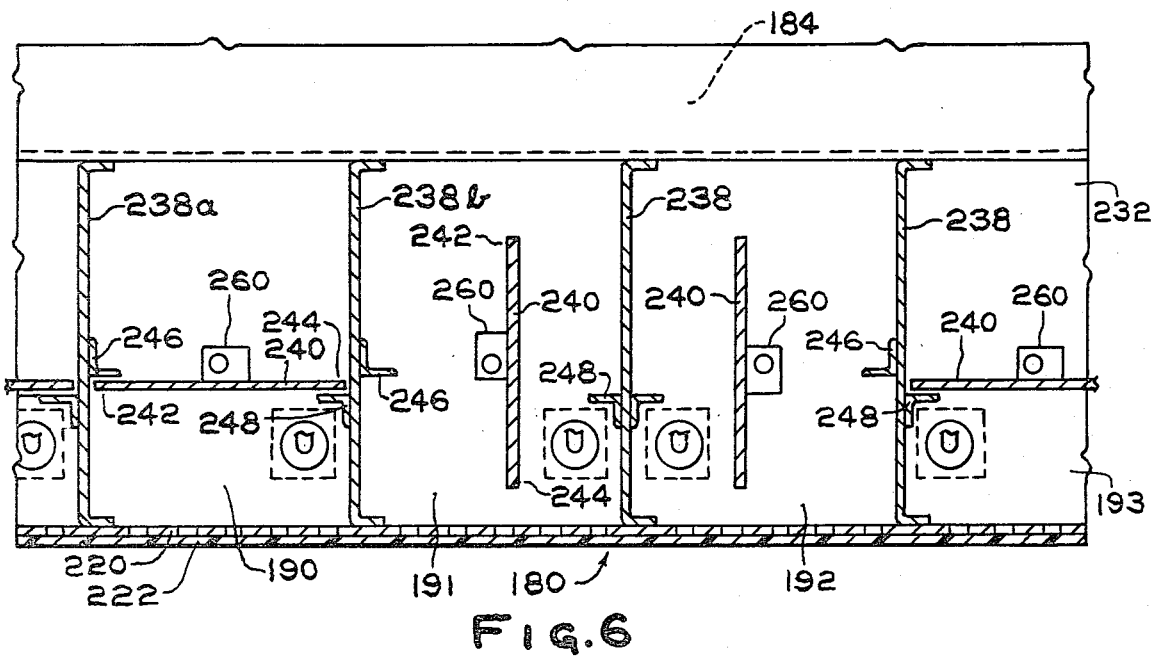
FIG. 6 is a view similar to the view of FIG. 5 enlarged and having portions removed to show the interior of chambers.

Referring to FIG. 6, side plates 238 are positioned at selected intervals within the sheet engaging assembly 182 parallel to end members 234 and 236 to establish chambers therein which communicate with the vacuum plenum 184 at their top surface and with the ambient atmosphere through apertured plate 220 and foraminous pad 222 at their bottom surface. For example, chamber 190 is defined by side plates 238a and 238b, elongated C-shaped members 230 and 232 (only 232 shown in FIG. 6) and apertured plate 220. The embodiment herein described, although not limiting to the invention, incorporates 19 side plates 238 to yield twenty vacuum chambers 188–207.

Figure 7:
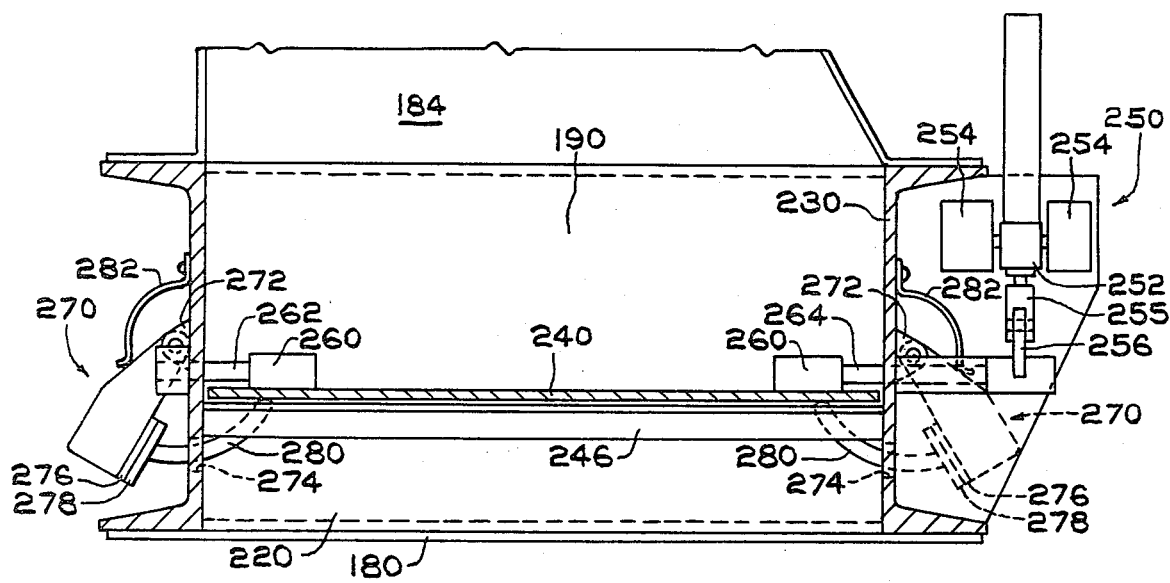
FIG. 7 is a sectional view taken along lines 7—7 of FIG. 5.

Referring now to FIGS. 6 and 7, the interior of a single vacuum chamber 190 will be described, it being understood that each of the vacuum chambers 188–207 are constructed in substantially the same manner, unless otherwise indicated. As shown in FIG. 6, vacuum plate 240 is pivotally mounted within vacuum chamber 190 about a longitudinal axis through the center of vacuum chamber 190 and rotates through an arcuate path, e.g., about 90°. Referring to FIG. 7, pivotal mounting can be accomplished in any convenient manner; for example, by attaching vacuum plate 240 to a pair of mounting plates 260 which are rigidly attached to shaft 262 and driveshaft 264, which in turn pass through opposing chamber end walls and freely rotate therein. Activation of driveshaft 264 will be discussed more fully hereinafter.

Referring to FIG. 6, when vacuum plate 240 is disposed into a vertical orientation (as shown in chambers 191 and 192), there is communication between the vacuum plenum chamber 184 and the apertured plate 220 to apply vacuum for lifting a sheet, i.e., the chamber is in a sheet engaging condition. When vacuum plate 240 is disposed into a horizontal orientation (as shown in chambers 190 and 193) the marginal edge portions 242 and 244 of vacuum plate 240 are biased against opposing right-angled edge seal members 246 and 248 respectively, which are affixed along the lengths of plates 238, to provide a seal to isolate the vacuum plenum chamber 184 from the apertured plate 220 to preclude lifting a sheet, i.e. the chamber is in a non-engaging condition.

As best illustrated in FIGS. 5 and 7, the movement of vacuum plate 240 is controlled by an activating mechanism 250 conveniently mounted to the exterior surface of channel beam 230. Activating mechanism 250 includes a piston cylinder assembly 252, one end of which is rigidly attached to the outside of vacuum chamber 190 by bracket 254. The rod 255 of piston cylinder assembly 252 is pivotally mounted to one end of camming member 256, the other end of which is rigidly attached to the exterior end of driveshaft 264.

As can be appreciated, activation of piston cylinder assembly 252 to extend rod end 255 will act through camming member 256 to directly rotate vacuum plate 240 from a non-engaging position to an engaging position.

Referring to FIG. 7, facilities are provided to more quickly release engaged articles by introducing atmospheric pressure to the interior surface of the apertured bottom wall portion 220 when the vacuum plate 240 is disposed into its non-engaging position. In this manner, a sheet engaged by the sheet engaging surface 180 of vacuum chamber 190 will be positively released from engagement when vacuum plate 240 is pivoted from its engaging to its non-engaging position. A trap door assembly 270 is pivotally mounted to the exterior of channel beams 230 and 232 by a mounting bracket 272 and extends in a generally downward direction therefrom as viewed in FIG. 7. Referring to one such facility, mounting bracket 272 is positioned on channel beam 230 spaced to one side of the center of vacuum chamber 190 and above the plane formed by the non-engaging position of vacuum plate 240. Aperture 274 is disposed in channel beam 230 directly below mounting bracket 272 and below the plane formed by the non-engaging position of the vacuum plate 240, i.e., below edge seal member 246. At the lower edge of trap door assembly 270 is positioned a circular plate 276 covered by a pad of non-porous rubber 278, both corresponding in position to aperture 274 to seal same when trap door assembly 270 is in its closed position. Extending into vacuum chamber 190 from circular plate 276 through aperture 274 is an upwardly curved arm 280, the end of which extends above edge seal member 246 when the trap door is in its closed position. A spring 282, e.g., leaf spring, is attached at one end to channel beam 230 and the other end is disposed on trap door assembly 270 to bias it towards aperture 274. It will be appreciated that leaf spring 282 will bias trap door assembly to a closed position when vacuum plate 240 is in its engaging position, thus sealing aperture 274 and yielding efficient communication of vacuum from vacuum plenum 184 to apertured bottom wall portion 220. When vacuum plate 240 is disposed into a non-engaging orientation, curved arm 280 is biased downward by contact with vacuum plate 240, thus opening trap door assembly 270 and introducing atmospheric pressure to the interior surface of apertured wall portion 220, providing a quick release of engaged sheets. The invention may be practiced using only one trap door assembly instead of two as shown in FIG. 7. It will be appreciated that the present invention is not limited to the trap door assembly herein described, as many convenient ways exist to controllably introduce atmospheric pressure to the interior surface of apertured bottom wall portion 220 when vacuum plate 240 is horizontally oriented.

Figure 8:
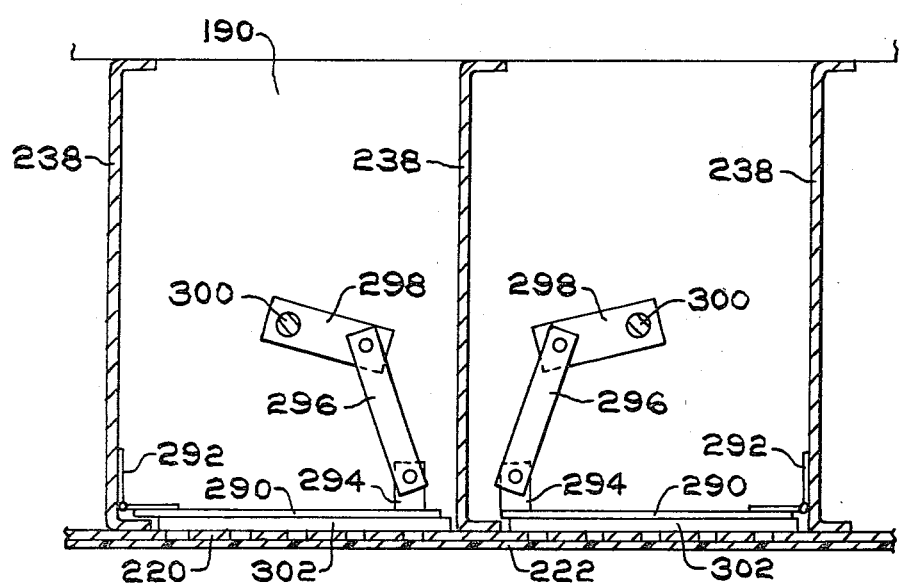
FIG. 8 is an elevational sectional view similar to that of FIG. 6 showing interior elements of an alternate embodiment of the present invention.

A further embodiment of vacuum chamber 190 illustrated in FIG. 8 consists of vacuum plate 290 disposed near the bottom of vacuum chamber 190 and pivotally mounted at one end to side plate 238 by hinge 292. One end of short arm 294 is rigidly mounted to vacuum plate 290, with its other end pivotally mounted to one end of a first control arm 296. The other end of control arm 296 is pivotally mounted to a second control arm 298, which in turn is rigidly attached to driveshaft 300. Driveshaft 300 extends through vacuum chamber 190 and attaches to external activating mechanism 250 previously discussed. A layer of nonporous rubber material 302 is fastened to the bottom surface of vacuum plate 290, to contact and seal the apertured bottom wall portion 220 from the vacuum chamber interior, when the vacuum plate 290 is in a horizontal disposition. It will be appreciated that vacuum plate 290 can be pivoted from a horizontal orientation by rotation of driveshaft 300, thus permitting communication between vacuum plenum 184 (above but not shown) and apertured bottom wall portion 220. This embodiment provides for a positive release of engaged articles without the need for the trap door assembly previously discussed. When vacuum plate 290 is returned to its horizontal orientation, nonporous rubber material 302 engages apertured bottom wall portion 220 to isolate the vacuum plenum 184 from the engaged article, and simultaneously eliminates any residual vacuum, thus positively releasing the engaged article. A further advantage of this embodiment is the efficiency with which it utilizes vacuum in the vacuum chamber. Upon release of an engaged article, the vacuum within the chamber is not lost to the atmosphere because vacuum plate 290 is positioned in such close proximity to apertured bottom wall portion 220.

As previously described with reference to FIG. 1, a large rectangular glass piece 22 is cut into a generally rectangular array of smaller rectangular glass sheets 60-74 while travelling along conveyor 40 towards pickup position 49. Prior to arrival at pickup position 49, glass sheet 60-74 pass through inspection station 48 wherein a determination is made of which ones of glass sheets 60-74 will be lifted and transferred. A signal is generated corresponding to the position of each selected and each unselected glass sheet 60-74 at pickup position 49, which is transferred to a control panel (not shown). The control panel has facilities to individually energize or deenergize activating mechanism 250 for each of vacuum chambers 188-207.

One method for controlling each activating mechanism 250 consists of an individual compressed air line (not shown) operatively attached to each piston cylinder assembly 252 and controlled by a solenoid valve in each line which is electrically activated by the control panel. Of course, numerous alternative control methods are available, and the one herein described is not limiting to the present invention.

In a preferred method of operation for the embodiment illustrated in FIGS. 6 and 7, vacuum plates 240 in each of vacuum chambers 188-207 are positioned in their non-engaging position, followed by activation of the vacuum supply, thus establishing a negative pressure in the vacuum plenum 184, and in that area of each vacuum chamber 188-207 above vacuum plate 240. Referring to FIGS. 3 and 4, sheet lifting assembly 154 is then moved into its raised position by activating piston cylinder assembly 169, and moved to conveyor 40 over glass sheets 60-64, i.e. Row 1, by the drive system 135. In this position, sheet engaging surface 180, corresponding to the bottom surface of foraminous pad 222, is positioned approximately one inch (2.54 cm) above glass sheets 60-64. Piston cylinder assembly 169 is then reactivated, permitting sheet lifting assembly 154 to descend approximately one inch (2.54 cm) to its lower position, thus slightly biasing foraminous pad 222 against glass sheets 60-64. According to the signal received from the inspection station 48, the control panel is operated to activate piston cylinder assembly 252 to pivot the vacuum plate 240 from its non-engaging orientation to its engaging orientation in those vacuum chambers 188-207 which overlie selected glass sheets. In those vacuum chambers which (1) overlie a portion of an unselected glass sheet, or (2) overlie no glass sheet, piston cylinder assembly 252 is not activated, and vacuum plates 240 remain in their non-engaging orientation, with trap door assembly 270 remaining in the open position.

In those activated vacuum chambers 188-207, vacuum will be communicated from the vacuum plenum 184 through the vacuum chamber 188-207, through the apertured bottom wall portion 220, and through the foraminous pad 222 to selected glass sheets to engage same. Vacuum chambers which receive no control panel signal will continue to isolate the vacuum plenum 184 from the unselected glass sheets.

Piston cylinder assembly 169 is then activated to move sheet lifting assembly 154 to its raised position, thus lifting selected glass sheets from conveyor 40 while leaving unselected glass sheets at pickup position 49. Sheet lifting assembly 154 is then transferred to a position over conveyor 50 at release position 51, at which time piston cylinder assembly 169 is reactivated to lower the sheet lifting assembly 154. A control panel signal pivots all vacuum plates 240 to the non-engaging position which in turn releases all selected glass sheets onto conveyor 50.

From the preceeding discussion and with reference to FIG. 1, it should be evident that the width of the sheet engaging surface 180 is preferably equal to or less than the width of the glass sheets 60-74 in order to prevent undue overlap onto sheets 65-69, i.e. Row 2, while acting on Row 1 sheets. This design characteristic is also preferred to reduce vacuum loss which would otherwise occur if the sheet engaging surface 180 extended beyond the edge of the glass sheets.

After release of Row 1 selected sheets, the sheet lifting assembly 154 is raised, transferred to a position over Row 2 and lowered thereon. Lifting, transferring, and releasing of Row 2 selected sheets is accomplished as before discussed, after which the sheet lifting assembly 154 is positioned over and lowered atop glass sheets 70-74, i.e. Row 3, sheets for a repeat of the lifting, transferring and releasing procedure.

After transfer device 47 lifts selected sheets from the last row, conveyor 40 progresses forward transferring the unselected sheets to a cullet hopper 52, while simultaneously resupplying Rows 1, 2, and 3 with inspected glass sheets 60-74.

Although the previous discussion was related to the embodiment of the invention illustrated in FIGS. 6 and 7, it will be clear to one skilled in the art that the embodiment of the invention illustrated in FIG. 8 is also operable in the above described method of operation.

As an alternative to the above-described method of operation, it may be desirable when lifting selected sheets from among unselected sheets in a row, to activate only those vacuum chambers which completely overlie only selected sheets. In other words, if a vacuum chamber overlies (1) any portion of an unselected sheet or (2) any space unoccupied by a sheet, including spaces between adjacent selected sheets, the chamber would not be activated. In this method of operation, vacuum is not lost from the system due to operation of chambers which are partially open to the ambient atmosphere, thus yielding more efficient vacuum utilization and permitting the use of a correspondingly lower volumetric capacity vacuum supply. This method is preferred for use when the ratio of sheet surface area to individual vacuum chamber engaging surface area is high, i.e., each selected sheet is engaged by several smaller chamber. Chambers which overlie but extend beyond the edge of the selected sheet can be deactivated while sufficient lifting force is still provided by those chambers which wholly overlie the center portion of the selected sheet.

As can be appreciated, a decision to use the above-described more efficient method of operation will necessarily be made after consideration of the relevant ratio of surface areas, weight of the sheets to be lifted, and lifting force supplied by each chamber.

The instant invention permits automatic high speed selective sheet transfer, while maintaining mechanical simplicity and economy. Further, the invention utilizes the vacuum within the vacuum plenum chamber with great efficiency, because sheet release can be accomplished by isolating the vacuum plenum 184 from the apertured bottom wall portion 220 by reorienting the vacuum plate 240 or 290 rather than by releasing all plenum vacuum. In this manner only a slight loss of vacuum occurs within the system upon release of selected sheets, which in turn permits the use of a vacuum supply of lower volumetric capacity. Further, vacuum loss during transfer is minimized by designing chamber size to be equal to or smaller than sheets to be transferred. This benefit is further enhanced if chambers which overlie any space unoccupied by a sheet are not activated.

It will be understood that the present invention is not intended to be limited by the number, size, or shape of vacuum chambers utilized, nor by the environment in which they are employed, but rather, by the claims which follow.

I claim:

1. An apparatus for transferring articles, comprising:
   a chamber having apertured wall portions to provide communication between chamber interior and environment;
   a first opening providing communication between vacuum means and the chamber interior;
   a second opening between said first opening and said apertured wall portions providing communication between the chamber interior and the environment;
   first means pivotly mounted within the chamber interior for isolating said second opening and said apertured wall portions from said first opening;
   second means mounting said chamber to overlay said second opening for isolating the chamber interior from the environment when said second isolating means is in a closed position;
   means for biasing said second isolating means toward the closed position;
   means acting on said first isolating means for moving said first isolating means to a first position to interconnect said first opening and said apertured wall portions and into a second position to isolate said apertured wall portions from said first opening; and
   said first isolating means pivoting into the second position acts on said second isolating means to urge said first isolating means against said biasing means to move said second isolating means out of the closed position to interconnect the chamber interior to the atmosphere by way of the second opening as said first isolating means isolates the first opening from said apertured wall portion.

2. The apparatus as set forth in claim 1 further comprising:
   a porous pad between said apertured wall portions and the articles, to provide a cushion therebetween.

3. The apparatus as set forth in claim 1 wherein said first isolating means comprises:
   a member rotatably mounted in said chamber to provide reciprocal rotary motion between said first position and said second position.

4. An apparatus as set forth in claim 1, 2, or 3 further comprising a plurality of said chambers adjacent one another with apertured wall portions aligned to form a sheet engaging surface.

5. The apparatus as set forth in claim 4 wherein said means for moving said first isolating means of each of said chambers operates independently of the other of said means for moving said first isolating means of each of said chambers.

6. A method of transferring at least one article, comprising the steps of:
   providing a chamber having apertured wall portions to provide communication between the chamber interior and the environment; a first opening for providing communication between vacuum means and the chamber interior and a second opening between the first opening and the apertured wall portions to provide communication between the chamber interior and the environment; first means mounting the chamber to overlay the second opening for isolating the chamber interior from the environment when the first isolating means is in a first position; means for biasing the first isolating means toward the first position; and second means pivotly mounted within the chamber interior for isolating the first isolating means and the apertured wall portions from the first opening;
   energizing the vacuum means to draw a vacuum through the chamber interior;
   moving the second isolating means to a first position to interconnect the first opening and the apertured wall portions;
   biasing an article toward the apertured wall portions by the vacuum in the chamber interior;
   moving the chamber to move the article;
   moving the second isolating means into a second position to isolate the apertured wall portions from said first opening, wherein the second isolating means pivoting into the second position acts on the first isolating means to urge the first isolating means against the biasing means to move the first isolating means away from the closed position to interconnect the chamber interior to the environment as said second isolating means isolates the first opening from the apertured wall portions to release the article.

7. The method as set forth in claim 6 wherein the at least one article is a plurality of articles and said providing step includes providing a plurality of chambers and further including the steps of:
   selectively practicing said step of moving the second isolating means to the first position on selected ones of the chambers to bias selected ones of the articles against the apertured wall portions of the selected chambers; and practicing said step of moving the second isolating means to the second position on selected ones of the chambers to release selected ones of the articles.

8. The method as set forth in claim 7 wherein said selectively practicing step is performed by drawing a vacuum through those chambers having apertured wall portions which overlie at least a portion of a selected article and overlie no portion of an unselected article.

9. The method as set forth in claim 7 wherein said selectively practicing step is performed by drawing a vacuum through those chambers having apertured wall portions which overlie a single selected article completely within the peripheral boundaries thereof.

10. The method as set forth in claim 8 or 9 wherein the articles are glass sheets.

* * * * *